(12) United States Patent
Shijoh

(10) Patent No.: US 9,131,187 B2
(45) Date of Patent: Sep. 8, 2015

(54) IMAGE INSPECTION APPARATUS TO DETECT A DEFECT IN A READ IMAGE

(71) Applicant: Takako Shijoh, Sagamihara (JP)

(72) Inventor: Takako Shijoh, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/174,419

(22) Filed: Feb. 6, 2014

(65) Prior Publication Data

US 2014/0226177 A1 Aug. 14, 2014

(30) Foreign Application Priority Data

Feb. 12, 2013 (JP) .................................. 2013-024688
Feb. 4, 2014 (JP) .................................. 2014-019199

(51) Int. Cl.
*G06K 15/00* (2006.01)
*H04N 1/44* (2006.01)
*G06K 9/00* (2006.01)

(52) U.S. Cl.
CPC ..................................... *H04N 1/444* (2013.01)

(58) Field of Classification Search
CPC ........................... G06K 9/00442; H04N 1/444
USPC ............... 358/1.1, 1.9, 1.13, 1.14, 1.15, 1.18; 382/100, 144, 149, 112
See application file for complete search history.

(56) References Cited

U.S. PATENT DOCUMENTS

| 8,742,344 B2* | 6/2014 | Hatakeyama et al. | 250/310 |
| 2005/0041836 A1* | 2/2005 | Takeda et al. | 382/100 |
| 2010/0008564 A1* | 1/2010 | Hayakawa et al. | 382/149 |
| 2012/0141012 A1* | 6/2012 | Sakai et al. | 382/149 |

FOREIGN PATENT DOCUMENTS

| JP | 2008-003876 | 1/2008 |
| JP | 2009-076009 | 4/2009 |
| WO | WO 00/31964 | 6/2000 |

OTHER PUBLICATIONS

U.S. Appl. No. 14/026,393, filed Sep. 13, 2013.

* cited by examiner

*Primary Examiner* — Gabriel Garcia
(74) *Attorney, Agent, or Firm* — Oblon, McClelland, Maier & Neustadt, L.L.P.

(57) ABSTRACT

An image inspection apparatus is provided for inspecting an image output on a recording medium by scanning the output image. The image inspection apparatus includes an inspection reference image generator to obtain an output-target image print data, and to generate an inspection reference image using the output-target image print data, an inspection result acquisition unit to acquire a result of a defect determination based on a difference between the generated inspection reference image and the read image, a restriction-on-disclosure process unit to change, based on restriction-on-disclosure positional information, which indicates a restricted area in the read image that should be restricted when displayed, a value of a pixel in the restricted area, when a defect is detected in the read image, to generate a corrected image, and an information transmission unit to transmit the corrected image through a network.

15 Claims, 15 Drawing Sheets

PREPRINT IMAGE     VARIABLE MASTER IMAGE     MASTER IMAGE

VARIABLE DATA IMAGE     RESTRICTION-ON-DISCLOSURE INFORMATION

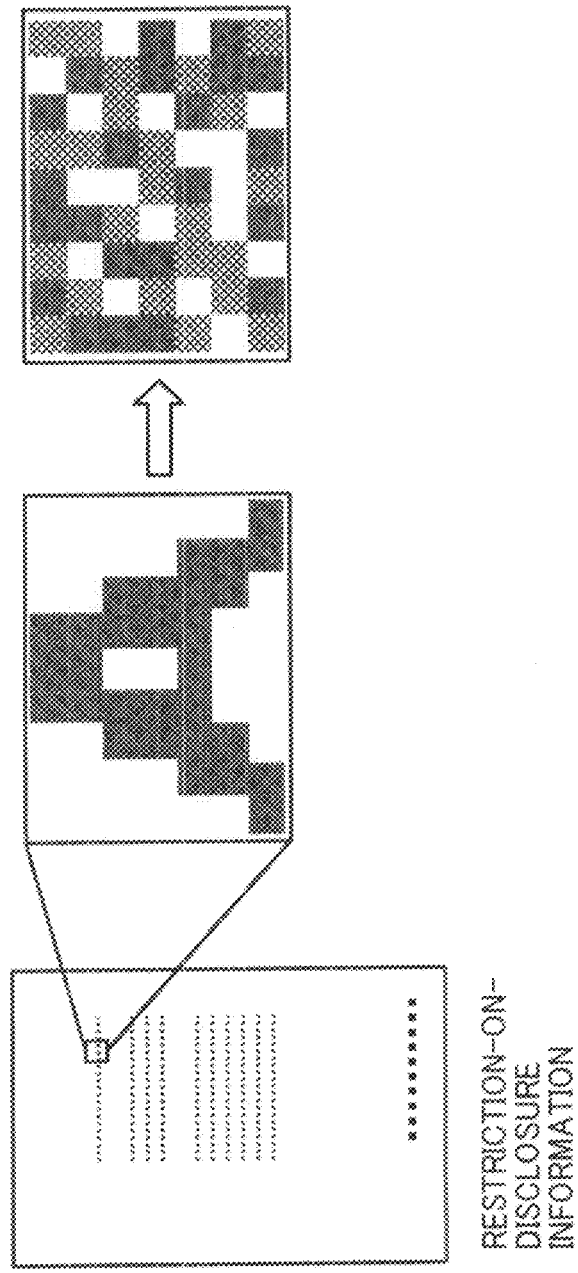

FIG. 14

|     | AGGREGATE PAYMENT | $50,360 |
| (a) | PAY DAY | 12 / 25 / 2012 |

|     | AGGREGATE PAYMENT | $▒▒▒ |
| (b) | PAY DAY | ▒▒ / ▒▒ / ▒▒ |

|     | AGGREGATE PAYMENT | $50,360 |
| (c) | PAY DAY | 12 / 25 / 2012 |

|     | AGGREGATE PAYMENT | $▒▒▒ |
| (d) | PAY DAY | ▒▒ / ▒▒ / ▒▒ |

|     | AGGREGATE PAYMENT | $▒▒▒ |
| (e) | PAY DAY | ▒▒ / ▒▒ / ▒▒ |

FIG. 15

```
< FORM 1 >
 < TITLE > DAILY REPORT < POSITION > XX, XX
 < DATE > XX/XX/XX < POSITION >  XX/XX
 < NAME > XXXX < POSITION >  XX, XX
   < AFFILIATED POST > XX/XX < POSITION > XX, XX
   < MAIL ADDRESS > XXXX@XXXX.COM < POSITION > XX, XX
   < TELEPHONE NUMBER > XXXXXXXXXX < POSITION > XX, XX
 < Contents Of A Report > XXXX, XXXX , XXXX < POSITION > XX, XX
```

FIG. 16

```
NAME
AFFILIATED POST
MAIL ADDRESS
TELEPHONE NUMBER
Contents Of A Report
```

FIG. 17

| AGGREGATE PAYMENT | $ ▨▨▨ |
|---|---|
| PAY DAY | 1̸2̸ / ▨▨ / 2012 |

FIG. 18

| DISPLAY AREA OF RESTRICTION-ON-DISCLOSURE INFORMATION | COORDINATE | SECURITY LEVELS | |
|---|---|---|---|
| AREA 1 | (XX, XX) - (XX, XX) | HIGH | |
| AREA 1 | (XX, XX) - (XX, XX) | HIGH | ... |
| AREA 1 | (XX, XX) - (XX, XX) | HIGH | |
| AREA 1 | (XX, XX) - (XX, XX) | LOW | |
| ... | | | |

SCANNED IMAGE                MASTER IMAGE

IMAGE INSPECTION APPARATUS TO DETECT A DEFECT IN A READ IMAGE

CROSS-REFERENCE TO RELATED APPLICATIONS

This patent application is based on and claims priority pursuant to 35 U.S.C. §119 to Japanese Patent Application No. 2013-024688, filed on Feb. 12, 2013, Application No. 2013-053995, filed on Mar. 15, 2013 and Application No. 2014-019199, filed on Feb. 4, 2014 in the Japan Patent Office. The contents of the above applications are incorporated herein by reference.

BACKGROUND

1. Field

The present embodiments relate to an apparatus, system, and method of inspecting an image formed by an image forming apparatus, and a recording medium storing an image inspection control program.

2. Description of the Related Art

Conventionally, inspection of printed matter is performed by human operators. In recent years, an inspection apparatus that automatically inspects printed matter is widely used, mainly in the field of offset printing. For example, a master image is generated by reading specific printed matter that is selected based on the image quality, as a reference image. The corresponding portions of the master image and a read image of printed matter are compared to determine, by the degree of difference therebetween, whether there is a defect in the printed matter.

A printing apparatus, such as an electrophotographic apparatus, is widely used to print a small number of pages. For example, a printing apparatus may perform variable printing in which the contents to be printed differ in each page. In this case, comparing the printed matter, with the master image generated from the printed matter is inefficient. In view of this, the master image may be generated based on print data to be output as a printed image of printed matter, and compared with the printed image subjected for inspection.

In such printout defect detection technologies, for example, the data of the page in which the defect is detected may be transmitted to another information processing apparatus via a network. Third parties may inspect the data of the page in which the defect was detected. For example, for the identification of the defect reason, a device maker may inspect the page. In this situation, personal information included in the inspection target image should be encrypted. Japanese Unexamined Patent Application Publication No. 2002-531015 proposes a method of encrypting the image information for every encoding unit of encoding the image information as a method of encrypting a part of the image information.

The technology disclosed by Japanese Application No. 2002-531015 is encrypting by making the encoding unit at the time of encoding image information into a unit. Therefore, the part that should not be disclosed on a displayed image cannot selectively be encrypted. In the above-mentioned image inspection, since it is necessary to disclose especially the part that has the defect, without encrypting, one needs to selectively encrypt only the part containing the personal information.

On the other hand, when a defect is detected in a portion that should be encrypted, that portion should be encrypted to protect information, but on the other hand, it is necessary to disclose the defect to a third party without encryption to determine the cause of the defect.

SUMMARY

In view of the above, the inventors of the present embodiments have discovered that there is a need for an apparatus, a system, a method, and a non-transitory recording medium storing an image inspection control program, each of which is configured to restrict disclosure of information while disclosing the content of a defect, when a defect is detected in a portion that should be encrypted in an image of the defect-determined page.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 12 shows a defect location instruction screen according to an example embodiment;

FIGS. 14A-E illustrate the encryption process of FIGS. 13A and 13B;

FIG. 15 shows an example of tag information;

FIG. 16 illustrates a listed of restricted information fields;

FIG. 17 illustrates an example of encryption processing;

FIG. 18 illustrates security level setting information; and

Figure 1:
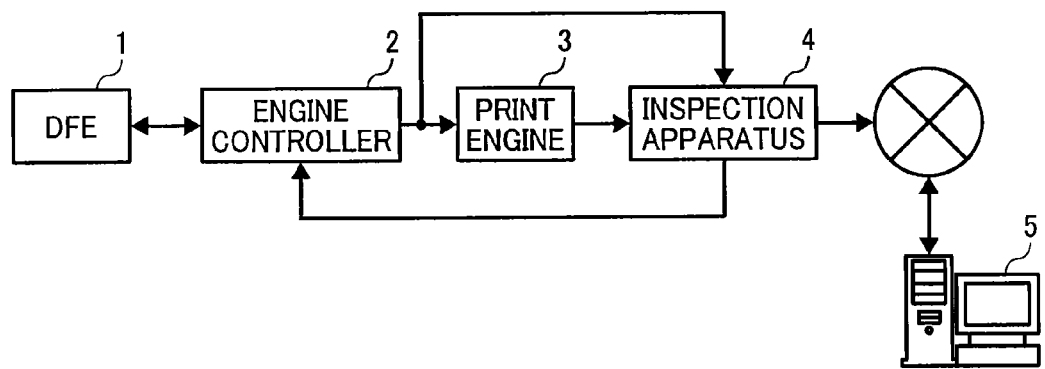
FIG. 1 shows a schematic configuration of an image forming system including an inspection apparatus according to an example embodiment.

The accompanying drawings are intended to depict example embodiments of the present inventions and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present inventions. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and can be implemented using existing hardware at existing network elements or control nodes. Such existing hardware may include one or more Central Processing Units (CPUs), digital signal processors (DSPs), application-specific-integrated-circuits, field programmable gate arrays (FPGAs) calculators or the like. These terms in general may be referred to as processors or processing circuits.

Unless specifically stated otherwise, or as is apparent from the discussion, terms such as "processing" or "calculating" or "calculating" or "determining" or "displaying" or the like, refer to the action and processes of a computing system, or similar electronic calculating device, that manipulates and transforms data represented as physical, electronic quantities within the computing system's registers and memories into other data similarly represented as physical quantities within the computing system memories or registers or other such information storage, transmission, or display devices.

FIG. 1 shows an example configuration of an image forming system according to an example embodiment. As shown in FIG. 1, the image forming system includes, for example, a digital front end (DFE) 1, an engine controller 2, a print engine 3, and an inspection apparatus 4. Moreover, the inspection apparatus 4 can communication with an information processing apparatus 5 through network lines, such as the Internet. Based on a received print job, the DFE 1 generates bitmap data, which is image data to be output (e.g., an output-target image), and outputs the generated bitmap data to the engine controller 2.

Based on the bitmap data received from the DFE 1, the engine controller 2 controls the print engine 3 to conduct an image forming operation. Further, the engine controller 2 transmits the bitmap data received from the DFE 1 to the inspection apparatus 4, wherein the bitmap data is used as data of original information for preparing an inspection reference image to be used for inspection at the inspection apparatus 4 when the inspection apparatus 4 inspects an output result of an image forming operation of the print engine 3.

Under control of the engine controller 2, the print engine 3 conducts an image forming operation on a recording medium, such as paper, using the bitmap data, and scans an output paper, such as a paper printed with an image, using a scanner, and inputs the read image data to the inspection apparatus 4. The recording medium may be, for example, a sheet such as paper, film, a plastic sheet, or any material that can be used for outputting (e.g., forming) an image by an image forming operation. Based on the bitmap data input from the engine controller 2, the inspection apparatus 4 generates the master image. Then, the inspection apparatus 4 compares the read image data, input from the print engine 3, and the generated master image to conduct an image inspection of the output image, so that the inspection apparatus 4 is used as an image inspection apparatus.

When the inspection apparatus 4 compares the read image read from the printed image to determine a defect in the output result, the inspection apparatus 4 notifies information indicating the page having the defect to the engine controller 2. Accordingly, reprinting of the defect page is performed by the engine controller 2. Moreover, the inspection apparatus 4 transmits to the information processing apparatus 5 through a network, after selectively encrypting information (hereafter, "restriction-on-disclosure information") that should not be disclosed to a third party among the information currently displayed on the defect page, according to an example embodiment.

The information processing apparatus 5 can be a common information processing apparatus, such as a PC (Personal Computer), and receives the image information of the defect-determined page according to the inspection result by the inspection apparatus 4.

Figure 2:
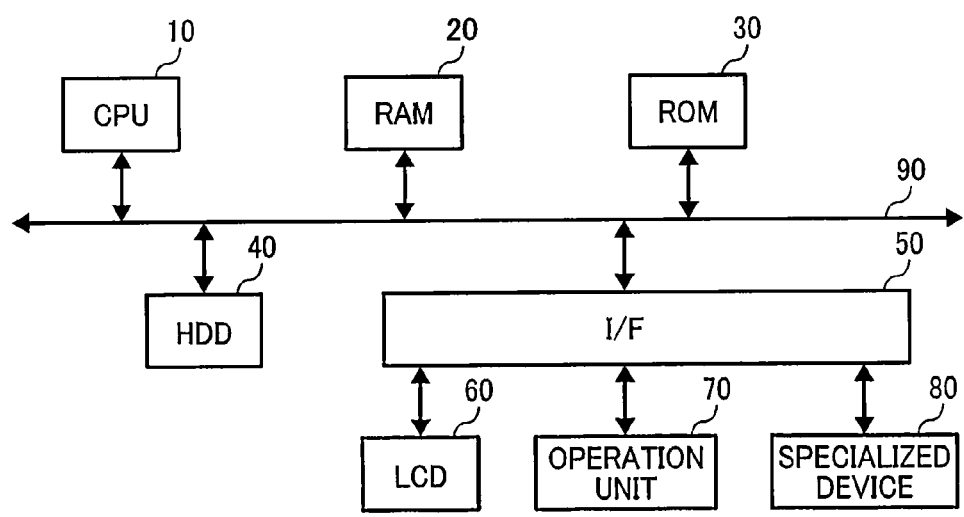
FIG. 2 shows an example block diagram of a hardware configuration of the inspection apparatus according to an example embodiment.

A description is given of a hardware configuration of the engine controller 2, the print engine 3, the inspection apparatus 4, and the information processing apparatus 5 according to an example embodiment with reference to FIG. 2. Further, as for the inspection apparatus 4, engines for a scanner and a printer may be added to the hardware configuration shown in FIG. 2. FIG. 2 shows a block diagram of an example hardware configuration of the inspection apparatus 4. The engine controller 2, the print engine 3, and the information processing apparatus 5 may have a hardware configuration similar to the inspection apparatus 4 shown in FIG. 2.

As shown in FIG. 2, the inspection apparatus 4 can be configured similarly to information processing apparatuses such as general servers, personal computers (PC), etc. Specifically, the inspection apparatus 4 includes a central processing unit (CPU) 10, a random access memory (RAM) 20, a read only memory (ROM) 30, a hard disk drive (HDD) 40, and an interface (I/F) 50, connectable to each other via a bus 90. Further, the I/F 50 is connectable to a liquid crystal display (LCD) 60, an operation device 70, and a specialized device 80.

The CPU 10 is implemented by a processor such as a microprocessor, which is configured to control the entire operation of the inspection apparatus 4. The RAM 20 is implemented by a volatile memory that writes various data thereto or reads various data therefrom with relatively high speeds. The RAM 20 may be used as a work memory area of the CPU 10. The ROM 30 is implemented by a nonvolatile memory from which various data is read. The ROM 30 may store various programs such as firmware. The HDD 40 is implemented by a nonvolatile memory from which various data is read. The HDD 40 may store various control programs such as an operating system (OS), and application programs such as an inspection control program.

The I/F 50 allows various hardware devices to be connected through the bus 90 or to the outside through a network, and controls those connections. The LCD 60 functions as a user interface, which allows a user to visually check the status of the inspection apparatus 4. The operation device 70 functions as a user interface, which allows the user to input various data to the inspection apparatus 4 using, for example, a keyboard or a mouse. The LCD 60 and the operation device 70 may be integrated into one device, for example, in the form of a touch panel screen.

The specialized device 80 may be disposed as hardware to conduct a specific capability or function for each of the engine controller 2, the print engine 3, and the inspection apparatus 4. For example, as for the print engine 3, the specialized device 80 may be a plotter to conduct an image forming operation on sheets, and a scanner to scan images output on the sheets. Further, as for the engine controller 2 and the inspection apparatus 4, the specialized device 80 may be a specific calculating circuit to conduct high-speed image processing, and the specialized device 80 may be, for example, an application specific integrated circuit (ASIC).

In the above hardware configuration, software programs stored in a storage area such as the ROM 30, the HDD 40, or an optical disk can be read and loaded to the RAM 20, and the CPU 10 runs such programs to control various units, with which a software-executing controller can be configured. With a combination of such software-executing controller and other hardware, functional blocks to operate the engine controller 2, the print engine 3, the inspection apparatus 4, and the information processing apparatus 5 can be configured. In an example embodiment, each of the disclosed units is implemented as hardware or as a combination of hardware and software.

Figure 3:
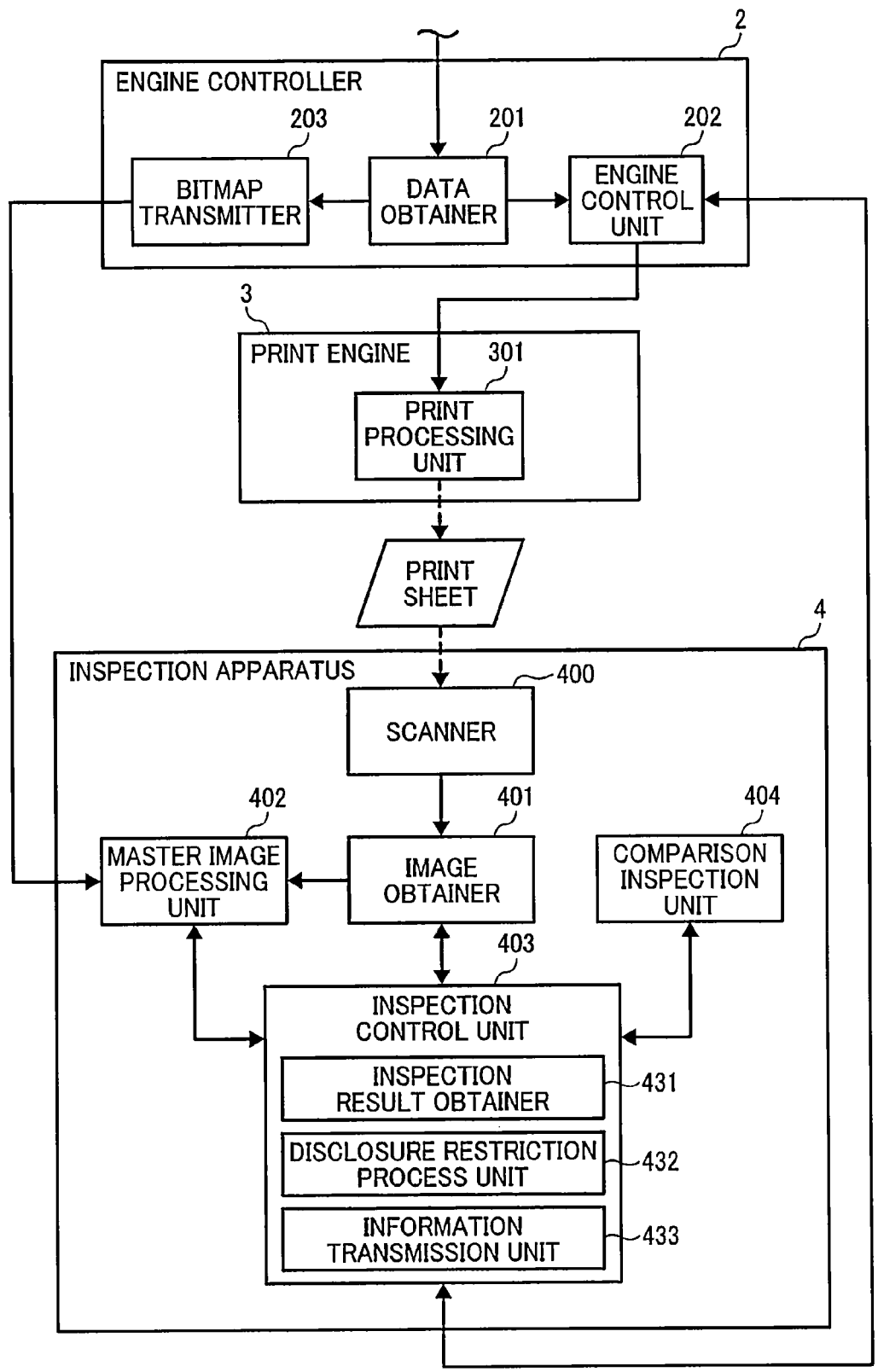
FIG. 3 shows an example block diagram of an engine controller, a print engine, and an inspection apparatus according to an example embodiment.

FIG. 3 shows an example block diagram of the engine controller 2, the print engine 3, and the inspection apparatus 4. In FIG. 3, the solid lines show the data, and the broken lines show the flow of the recording sheets. As shown in FIG. 3, the engine controller 2 includes, for example, a data obtainer 201, an engine control unit 202, and a bitmap transmitter 203. Further, the print engine 3 includes, for example, a print processing unit 301. Further, the inspection apparatus 4 includes, for example, a read image obtainer 401, a master image processing unit 402, an inspection control unit 403, and a comparison inspection unit 404. The inspection control unit 403 includes, for example, an inspection result obtainer 431, a disclosure restriction process unit 432, and an information transmission unit 433.

Upon obtaining the bitmap data from the DFE 1 by the data obtainer 201, the engine control unit 202 and the bitmap transmitter 203 are operated. The bitmap data is information of pixels composing an image to be output by an image forming operation, and the data obtainer 201 can function as a pixel information obtainer. Moreover, the data obtainer 201 obtains the restriction-on-disclosure positional information, which shows the position where the above-mentioned restriction-on-disclosure information is displayed on the image expressed with the received bitmap data from DFE 1.

Based on the bitmap data transferred from the data obtainer 201, the engine control unit 202 instructs the print engine 3 to conduct an image forming operation, in which the engine control unit 202 can function as an output execution control unit. The bitmap transmitter 203 transmits the bitmap data, obtained by the data obtainer 201, to the inspection apparatus 4. The bitmap transmitter 203 transmits the above-mentioned restriction-on-disclosure information to the inspection apparatus 4.

The print processing unit 301 obtains the bitmap data input from the engine controller 2, conducts an image forming operation to a sheet, and outputs a printed sheet. Therefore, the print processing unit 301 can function as an image forming apparatus. The print processing unit 301 can use any types of image forming mechanism including, for example, an electrophotography, an inkjet method, etc.

The scanner 400 scans an image formed on a sheet by conducting a printing operation by the print processing unit 301, and outputs read data. The scanner 400 is, for example, a line scanner disposed along a transport route of a sheet output by the print processing unit 301, in which the scanner 400 scans the transported sheet face to read an image formed on the sheet.

The read image read by the scanner 400 is an inspection target inspected by the inspection apparatus 4. Because the read image is an image of the sheet face that formed the image and is output, it becomes the image indicating an output result.

The read image obtainer 401 obtains the read image data generated by scanning the sheet face by the scanner 400 in the print engine 3. The read image obtainer 401 inputs the read image data as an inspection target image to the inspection unit 404. In addition, the input of the read image to the inspection unit 404 is carried out by the inspection control unit 403. In that case, the inspection control unit 403 acquires the read image and inputs the read image to the inspection unit 404.

As described above, the master image processing unit 402 obtains the bitmap data input from the engine controller 2, and generates the master image as an inspection reference image to be compared with the inspection target image. Therefore, based on the output-target image, the master image processing unit 402 is used as an inspection reference image generator that generates the master image as the inspection reference image to be used for inspecting the read images.

Moreover, the master image processing unit 402 receives the restriction-on-disclosure positional information from the bitmap transmitter 203, to generate information for encrypting a position where the restriction-on-disclosure information is displayed in the read image, at a resolution corresponding to the resolution of the master image.

The inspection control unit 403 controls the inspection apparatus 4 as a whole, and each unit in the inspection apparatus 4 is operated under the control of the inspection control unit 403. The inspection control unit 403 transmits the read image in which restriction-on-disclosure information was encrypted to the information processing apparatus 5 according to the inspection result of the read image.

Among each module contained in the inspection control unit 403, the inspection result obtainer 431 inputs the master image generated by the master image processing unit 402 and the read image obtained by the read image obtainer 401 into the comparison inspection unit 404 to obtain the comparison result. Moreover, the disclosure restriction process unit 432 performs an encryption process on the image in which an indication was restricted among the images by which a defect was discovered, based on the result of the comparison inspection. The information transmission unit 433 transmits the image on which the encryption process was carried out to the information processing apparatus 5.

The comparison inspection unit 404 is used as an image inspection unit that compares the read image data, input from the read image obtainer 401, and the master image, generated by the master image processing unit 402, to determine whether a desired image forming operation is conducted. The comparison inspection unit 404 may be configured with the above mentioned ASIC, etc. to calculate a great amount of data with high speed processing. In the present embodiments, the inspection result obtainer 431 controls the comparison inspection unit 404. Therefore, the inspection result obtainer 431 and the comparison inspection unit 404 work together to function as an image inspection unit.

The comparison inspection unit 404 compares the read image data and the master image expressed with 8 bits for each of RGB (total of 24 bits), as described above for each corresponding pixel, and calculates a difference of pixel values for each of RGB for each pixel. Based on the comparison of the calculated difference and a threshold, the inspection result obtainer 431 determines whether a defect exists in the read image data.

Further, the calculated difference and the threshold can be compared by the inspection result obtainer 431 as follows. For example, difference values computed by the comparison inspection unit 404 for each of the pixels are summed for a given area of an image as a total value, and the total value is compared with the threshold, which is set to be compared with the total value. The given area for summing the difference values of each of the pixels is, for example, several dots, several dozen dots per square area, or one hundred and several dozen dot square area.

Figure 19:
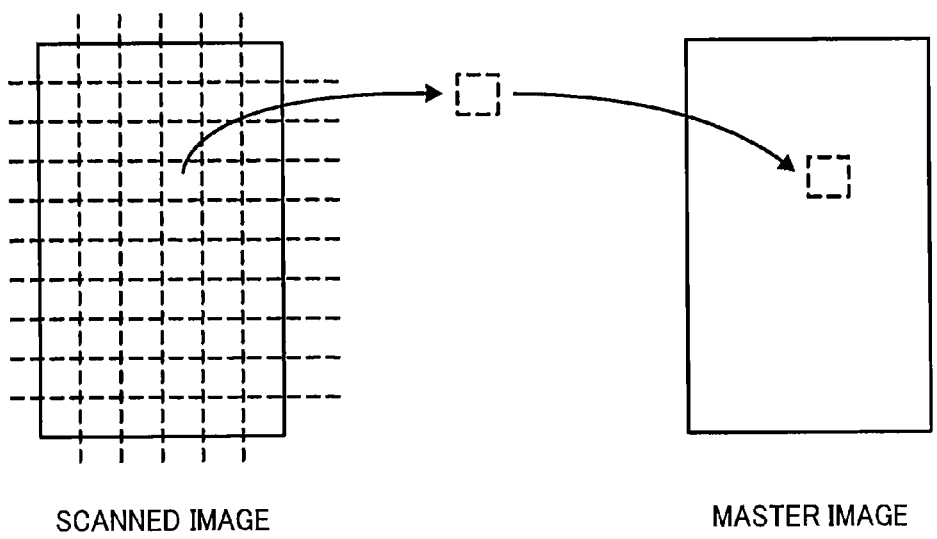
FIG. 19 illustrates an example of divided areas.

When comparing the read image with the master image, the inspection result obtainer 431 superimposes the read image segmented in a predetermined range on the master image corresponding to the segmented range, as illustrated in FIG. 19, to calculate the difference of pixel values, that is, the difference values of the intensity between the pixels. Thus, the inspection result obtainer 431 obtains pixel values from the master image and the read image in the range for superimposing and inputs the obtained master image and the obtained read image into the comparison inspection unit 404.

When comparing the read image and the master image, the read image is divided into a plurality of areas, as shown in FIG. 19. The inspection result obtainer 431 superimposes each divided area to a corresponding area of the master image to compute a difference of pixel values for each pixel such as difference of density. Further, a position of superimposing the divided area to the master image is shifted left/right and up/down to determine a position where the computed difference becomes the smallest, and the smallest difference is used as a comparison result. Each one of the divided areas shown in FIG. 19 can be used as the above-described defect determination unit area.

Further, in another method, each pixel is determined as normal or a defect based on a comparison result of the difference computed for each pixel and the threshold, and the counted number of pixels determined being defective and a predetermined threshold set for the counted number are compared.

Figure 4:
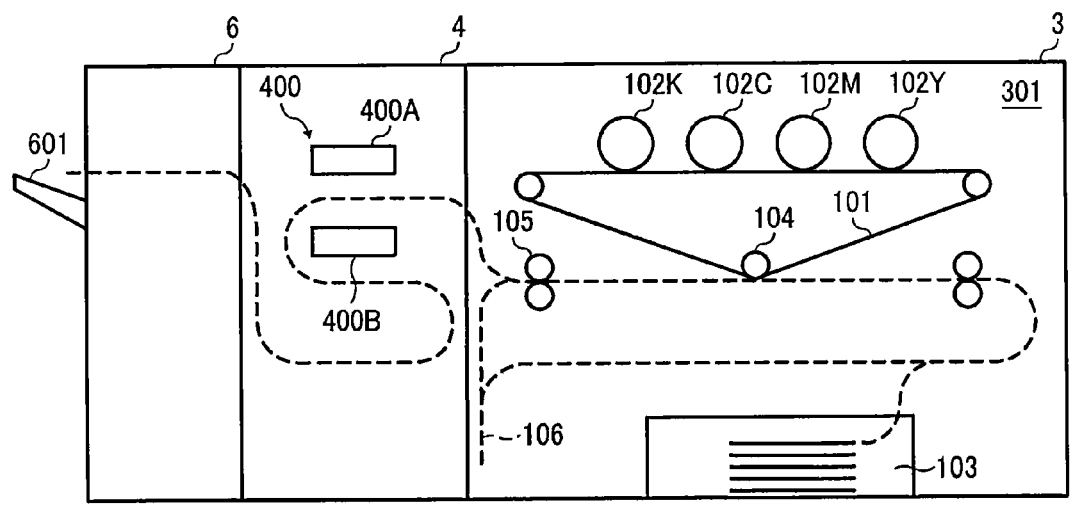
FIG. 4 shows a process of comparing images for inspection according to an example embodiment.

The image inspection system of FIG. 4 can be implemented by a system including a print engine 3, an inspection apparatus 4, and a stacker 6 used for PC in FIG. 1. The print engine 3 is implemented as a tandem-type image forming device. More specifically, the print engine 3 includes a plurality of photoconductive drums 102Y, 102M, 102C, and 102K (collectively referred to as the photoconductive drum 1), which are disposed side by side along a transfer belt 101 in the direction from the upstream of the sheet transfer direction. The transfer belt 101, which is an endless belt, is an intermediate transfer belt, which is formed with an intermediate transfer image to be transferred onto the recording sheet fed by a sheet feeding tray 103. In operation, the toner images of the respective colors, which are formed on the surfaces of the photoconductive drums, are transferred to the transfer belt 101 one above the other to form the full-color toner image.

The full-color toner image formed on the transfer belt 101 is conveyed to a transfer position between a transfer roller 104 and a sheet transfer path (indicated by a dotted line in FIG. 4). At the transfer portion, the full-color toner image is transferred from the transfer belt 101 to the recording sheet, which is transferred through the sheet transfer path by a plurality of transferring rollers.

The recording sheet having the full-color toner image formed thereon is further conveyed to a fixing roller 105. The fixing roller 105, together with a pressure roller, fixes the toner image onto the recording sheet by heat and pressure. The recording sheet is further conveyed to the inspection apparatus 4. In case of printing double-sided images, the recording sheet having one side with the fixed toner image is conveyed to a switchback path 106, and transferred back to the transfer roller 104 to receive another image on the other side of the recording sheet.

In the conveyance route of the paper inside inspection apparatus 4, the scanner 400 reads each surface of the paper conveyed from the print processing unit 301 by imaging units 400A, 400B respectively prepared in the double surface side of the paper at a conveyance route of the paper inside inspection apparatus 4. The scanner 400 outputs data to the read image obtainer 401, which forms the read image. Moreover, the paper in which the paper surface was read is further conveyed inside the inspection apparatus 4, is conveyed by the stacker 6, and is ejected by the paper delivery tray 601.

Figure 5:
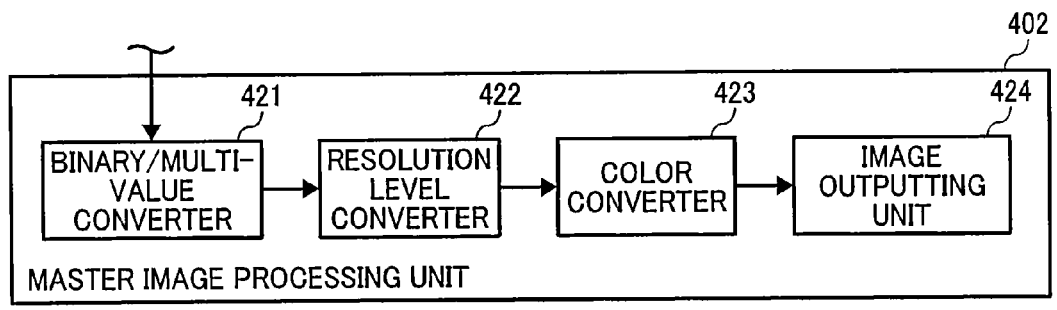
FIG. 5 shows a schematic mechanical configuration of a print processing unit according to an example embodiment.

A description is given of the master image processing unit 402 with reference to FIG. 5. FIG. 5 shows an example block diagram of the master image processing unit 402. As shown in FIG. 5, the master image processing unit 402 includes, for example, a binary/multi-value converter 421, a resolution level converter 422, a color converter 423, and an image outputting unit 424. The master image processing unit 402 can be devised as the specialized device 80 (see FIG. 2), composed of a combination of hardware and software, such as an ASIC controlled by software. Further, the inspection unit 404 and the master image processing unit 402 can be configured using an ASIC as described above. Further, the inspection unit 404 and the master image processing unit 402 can be configured using a software module executable by the CPU 10.

The binary/multi-value converter 421 conducts a binary/multi-value converting process to a binary format image expressed in binary, such as color/non-color, to generate a multi-valued image. The bitmap data is information input to the print engine 3. The print engine 3 conducts an image forming operation based on a binary format image for each color of cyan, magenta, yellow, and black (CMYK). Because the scanned image data, which is the inspection target image, is a multi-valued image composed of a multi-gradient image of the three primary colors of red, green and blue (RGB), a binary format image is initially converted to a multi-valued image by the binary/multi-value converter 421. The multi-valued image is, for example, an image expressed by 8 bits for each of CMYK.

Further, the print engine 3 conducts an image-forming operation based on a binary format image for each of CMYK, and the master image processing unit 402 includes the binary/multi-value converter 421, but other configurations are possible. For example, when the print engine 3 conducts an image-forming operation based on a multi-valued image, the binary/multi-value converter 421 can be omitted.

The resolution level converter 422 conducts a resolution-level conversion process to match a resolution level of a multi-valued image generated by the binary/multi-value converter 421 to a resolution level of the scanned image data (i.e., inspection target image). Because the scanner 400 generates scanned image data, for example, with the resolution level of 200 dots per inch (dpi), the resolution level converter 422 converts a resolution level of the multi-valued image generated by the binary/multi-value converter 421 to 200 dpi. Moreover, the resolution level converter 422 converts the resolution of the restriction-on-disclosure positional information input from the bitmap transmitter 203 into the resolution of 200 dpi mentioned above.

The color converter 423 obtains the image having been resolution-level converted by the resolution level converter 422 and conducts a color-converting process. Because the scanned image data is in an RGB-format, as described above, the color converter 423 converts the CMYK-format image having been resolution-level converted by the resolution level converter 422 to the RGB-format image, with which a multi-valued image of 200 dpi expressed with 8 bits for each of RGB (total 24 bits) for each pixel is generated.

As described above, in this example, the multivalue converter 421, the resolution converter 422, and the color converter 423 together function as an inspection image generator. In addition, in the present embodiment, since an additional plane is generated, in addition to 8 bits for each color of RGB, the quantity of information adds an additional plane of 8 bits, that is, 24 bits to 32 bits in total. This additional plane is a plane in which the information (hereinafter "the information for encryption") for the encryption of the restriction-on-disclosure information generated based on the above-mentioned restriction-on-disclosure positional information is stored. This additional plane is a 1-pixel an 8-bit plane, which is the data length corresponding to the gradation number similar to the plane of RGB for each color, for example, which is achieved by the alpha channel. Thus, by storing the information for encryption using an additional plane, exchange of data is facilitated, and it becomes possible to reduce a processing load.

The image outputting unit 424 performs a variable magnification process with respect to the RGB 8-bit, 200 dpi image and the restriction-on-disclosure positional information converted into 200 dpi by the process to the color converter 423. Thus, a size on the read image and the master image, which are input into the inspection apparatus 4 from the scanner 400 of the print engine 3, can be matched, and a position shift of the image can be reduced. Thereby, the position shift is reduced also about the position of the restriction-on-disclosure information shown by the restriction-on-disclosure positional information.

Thus, the master image is generated based on the bitmap data input from the bitmap transmitter 203. The master image generated in this way is an image of only the variable data output to the preprint paper, and is only the variable image that does not contain the preprint image. On the other hand, the read image that is generated by reading the output paper by the scanner 400 is an image combining the preprint image and the variable image. Therefore, the master image used for the comparison inspection must be an image combining the preprint image and the variable image.

Figure 6:
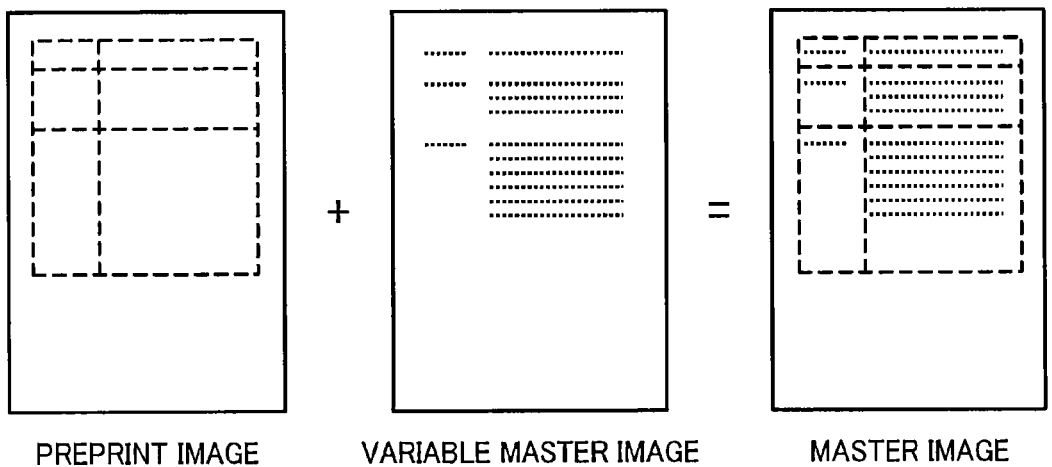
FIG. 6 shows an example block diagram of an inspection control unit according to an example embodiment.

Therefore, the image outputting unit 424 synthesizes the preprint image input from the read image obtainer 401 and the variable image (hereafter, variable master image) generated by the binary/multi-value converter 421, the resolution level converter 422, and the image outputting unit 424 to generate a final master image, as illustrated in FIG. 6.

In addition, the preprint image shown in FIG. 6, similar to bitmap data, is obtained from the engine controller 2. Further, when the read image generated by the scanner 400, which reads the paper in which only the preprint image was output, is input to the master image processing unit 402 through the read image obtainer 401, the preprint image is obtained by the master image processing unit 402.

Referring to FIG. 6, the variable master image and the preprint image each have a portion having drawing data, including characters or graphics such as lines, and a portion having no drawing data. Once the variable master image and the preprint image are combined into the master image, it would be difficult to figure out which portion of the master image is based on the drawing data of the preprint image, and which portion of the master image is based on the drawing data of the variable master image.

On the other hand, as mentioned above, the master image processing unit 402 generates the information for encryption for encrypting restriction-on-disclosure information based on the restriction-on-disclosure positional information converted into 200 dpi according to the present embodiment. The information for encryption, similarly to restriction-on-disclosure positional information, indicates the position where restriction-on-disclosure information is displayed in the read image. Therefore, it becomes possible, by using this information for encryption, to selectively encrypt the read image in the position where restriction-on-disclosure information is displayed among the read images.

Such a system includes formation of the information for encryption stored in the additional plane mentioned above, and an encryption process of the restriction-on-disclosure information using the information. Hereinafter, a process of the system according to the present embodiment is explained.

Figure 7:
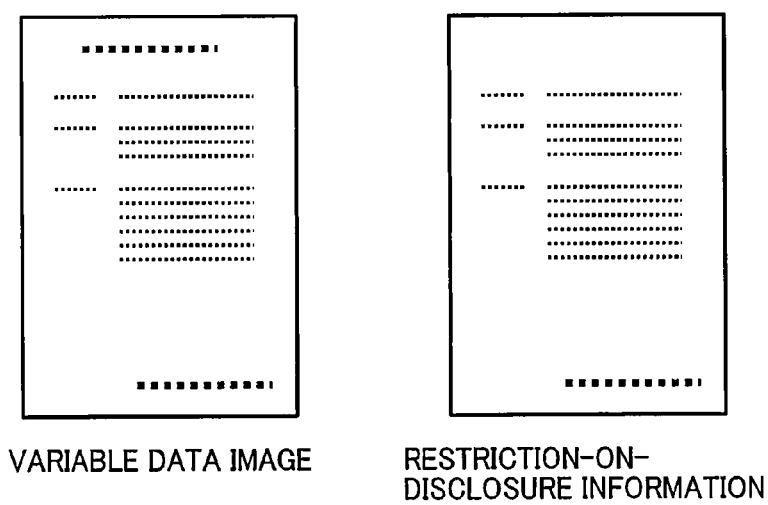
FIG. 7 shows restriction-on-disclosure information according to an example embodiment.

First, a formation process of the information for encryption according to the present embodiment is explained. FIG. 7 shows the restriction-on-disclosure information by contrast with the variable data image, which is the bitmap data, which is input from the bitmap transmitter 203 according to an example embodiment.

As shown in FIG. 7, information which should not be disclosed to a third party, such as personal information and confidential information, is contained in the variable data image. As information that shows the position where restriction-on-disclosure information is displayed like in FIG. 7, the restriction-on-disclosure positional information mentioned above is used.

Figure 8:
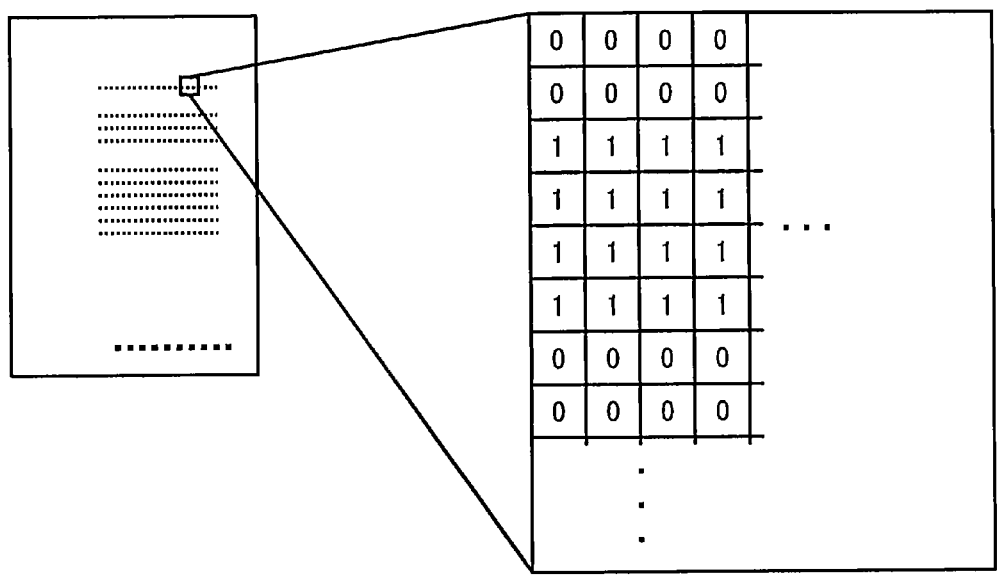
FIG. 8 shows restriction-on-disclosure positional information according to an example embodiment.

FIG. 8 shows the restriction-on-disclosure positional information according to the present embodiment. As shown in FIG. 8, the information indicating whether a pixel for displaying restriction-on-disclosure information is indicated by 1-bit data for each pixel in the resolution corresponding to the resolution of the bitmap data in the restriction-on-disclosure positional information according to the present embodiment. In the example of FIG. 8, when the information indicating whether a pixel for displaying restriction-on-disclosure information is "0", the pixel is not a pixel of the area of restriction-on-disclosure information, and when the information indicating whether a pixel for displaying restriction-on-disclosure information is "1", the pixel is a pixel of the area of restriction-on-disclosure information.

As above-mentioned, in the present embodiments, preprint printing prints with respect to the paper in which preprint images, such as a frame line, were printed previously. In the preprint printing, what kind of information and a printing position in an image are defined in advance. Therefore, it is easily possible to generate the restriction-on-disclosure positional information, as shown in FIG. 8.

As above-mentioned, the restriction-on-disclosure positional information according to the present embodiments is generated in a resolution corresponding to the resolution of bitmap data, and is input into the master image processing unit 402. The resolution-level converter 422 converts the data into, e.g., 200 dpi, which is the resolution of the master image. Therefore, the resolution of the restriction-on-disclosure positional information converted into 200 dpi is equivalent to the resolution of the variable master image.

The image outputting unit 424 according to the present embodiments generates the information for encryption based on the restriction-on-disclosure positional information, after performing the variable magnification process mentioned above, and stores it in the additional plane. In the case of generation of the information for encryption, the image outputting unit 424 according to the present embodiments refers to the information of each pixel of the restriction-on-disclosure positional information shown in FIG. 8. The image outputting unit 424 generates the value of 8 bits, which shows "0" if the value of a pixel is "0", and stores the value of 8 bits in the position of a pixel where the additional plane corresponds, as information for encryption.

Figure 9:
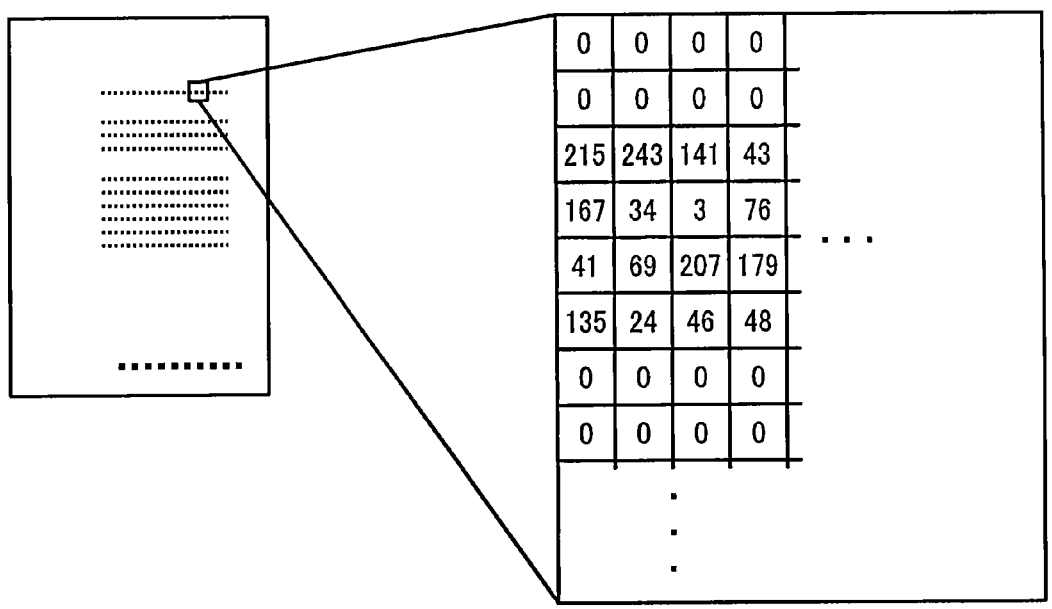
FIG. 9 shows a determiner result table according to an example embodiment.

On the other hand, the image outputting unit 424 generates the remaining values of 8 bits, i.e., the value in the range of "1"-"255", as a random number, if the value of the pixel of a restriction-on-disclosure positional information is "1", and stores the remaining values of 8 bits in the position of a pixel where the additional plane corresponds, as information for encryption. These values are used as key information at the time of encrypting restriction-on-disclosure information. The information shown in FIG. 9 is generated as the information for encryption by such a process, and is stored in the additional plane. When the read image is determined by the inspection control unit 403 as a defect page, the information for encryption generated as shown in FIG. 9 is used in order to encrypt restriction-on-disclosure information. The information for encryption shown in FIG. 9 is used as encryption pixel identification information that can identify the pixel at which restriction-on-disclosure information is displayed with the value registered into each pixel. That is, the master image processing unit 402 functions also as an encryption pixel identification information generation unit.

Figure 10A:
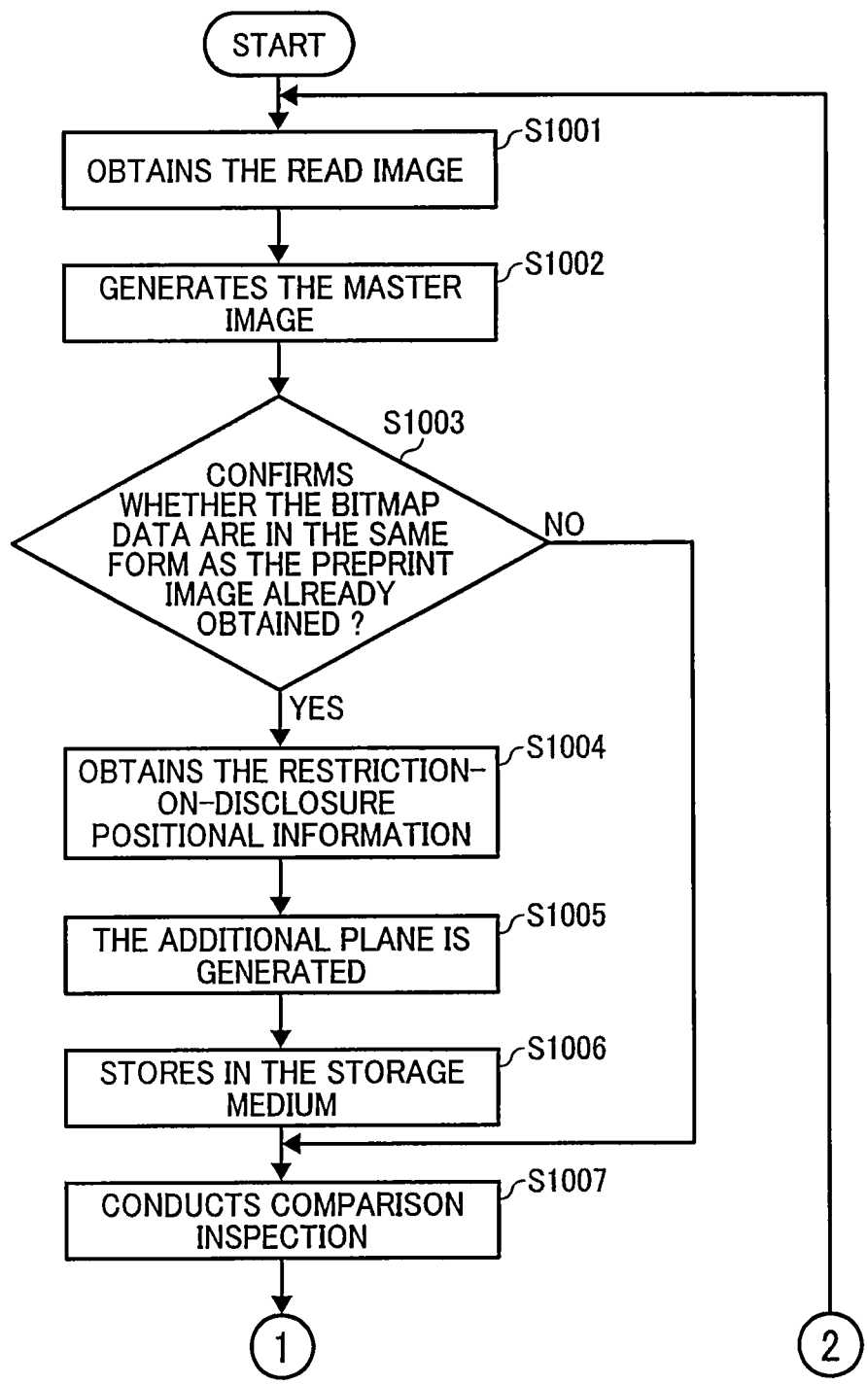
FIGS. 10A and 10B shows a flowchart illustrating an operation of an inspection apparatus according to an example embodiment.
Figure 10B:
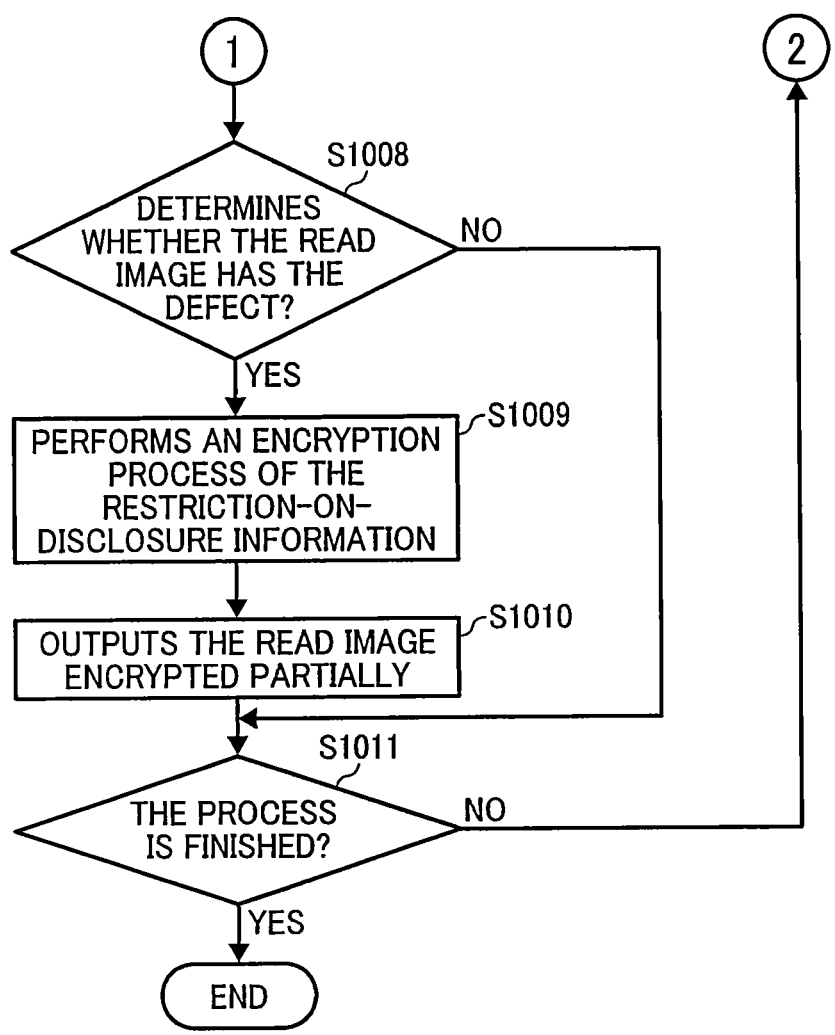

Next, an operation of the inspection apparatus 4 whole according to the present embodiments is explained. FIGS. 10A and 10B show a flowchart illustrating an operation of the inspection apparatus 4 according to the present embodiment. As shown in FIG. 10A, in the inspection apparatus 4, the scanner 400 performs the scan of the paper conveyed from the print engine 3, and the read image obtainer 401 obtains the read image (S1001). Moreover, the master image processing unit 402 generates the master image by the above-mentioned process based on the bitmap data input from the bitmap transmitter 203 (S1002).

Here, the image outputting unit 424 of the master image processing unit 402 confirms whether the bitmap data obtained from the bitmap transmitter 203 are in the same form as the preprint image already obtained (S1003). When the image outputting unit 424 confirms a new form, namely, the inspection of variable data with respect to the preprint image is different from the bitmap data that conducted the comparison inspection the last time (S1003/YES), on the result of confirmation of S1003, the image outputting unit 424 performs a formation process of the information for encryption mentioned above.

In a formation process of the information for encryption, the image outputting unit 424 obtains the restriction-on-disclosure positional information (S1004). Further, the additional plane, different from the plane of RGB, is generated (S1005). As mentioned above, based on the restriction-on-disclosure positional information shown in FIG. 8, the image outputting unit 424 forms the information for encryption as shown in FIG. 9, based on 0/1 of the information of each pixel. The image outputting unit 424 stores the information in the storage medium, which the inspection control unit 403 can access (S1006). This storage medium is, for example, a storage area on RAM 20.

When the process of steps S1004-S1006 is finalized, or when the result of step S1003 is NO, the inspection result obtainer 431 controls the comparison inspection unit 404, and conducts a comparison inspection between the read image obtained by the read image obtainer 401, and the master image generated by the master image processing unit 402 (S1007).

In addition, steps S1004-S1006 are performed for the image of the same form by which an image formation output is performed continuously, i.e., the first image by which the image formation output was initially carried out among images with the same preprint image, by the confirmation process of step S1003. Even if the variable data are different from each other, if the preprint images are the same, since the position where the restriction-on-disclosure information is displayed is the same, it is not necessary to form the information for encryption again. The time to obtain a test result by such a process can thus be shortened.

When the inspection result obtainer 431 determines that the read image has a defect based on the result of the comparison inspection (S1008/YES), the disclosure restriction process unit 432 performs an encryption process on the restriction-on-disclosure information in the read image based on the information for encryption. In step S1010, the information transmission unit 433 outputs the read image encrypted partially to the information processing apparatus 5. In step S1009, the disclosure restriction process unit 432 performs the encryption process on the restriction-on-disclosure information. That is, the disclosure restriction process unit 432 changes the value of the pixel in the area in which the information that should be restricted is located, making discrimination impossible. Then, the inspection control unit 403 repeats the process from step S1001 until the inspection of all the pages is finalized (S1011/NO). The process is finished if the inspection of all the pages is finalized (S1011/YES).

Figure 11:
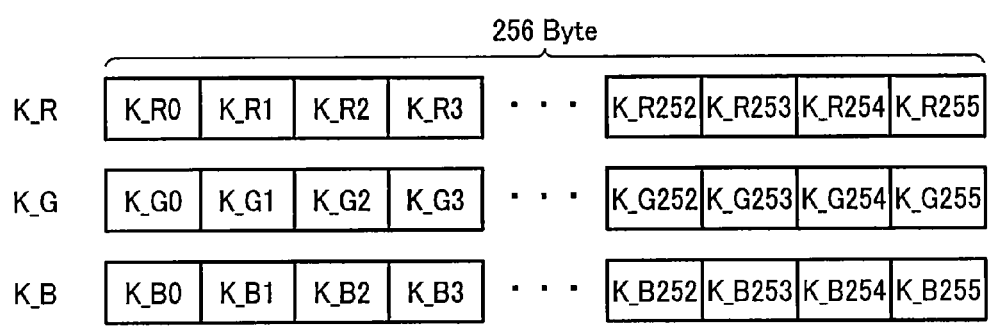
FIG. 11 shows a secret key according to an example embodiment.

Next, the process of step S1009 of FIG. 10B according to the present embodiments is explained. FIG. 11 shows the secret key that the disclosure restriction process unit 432 uses for encryption. As shown in FIG. 11, the secret key is 256 bytes of information for each color, prepared as K_R, K_G, and K_B for each color. Moreover, secret key information of each color is a set of 256 bytes of information. As shown in FIG. 11, each key information, for example, K_R, is the set of information from k_R0 to k_R255.

The disclosure restriction process unit 432 converts a pixel value $x_i$ in the read image at a pixel i into the pixel value $x_i'$ using the secret key information, as shown in FIG. 11, using formula (1):

$$X_i' = A\_R(k\_[R,G,B]_j, X_i) \tag{1}$$

Note that j is the encryption information corresponding to the pixel i.

In formula (1), for example, when the color of the encrypted pixel is R, and when the value of the encryption information corresponding to the pixel i is 34, "k_[R, G, B]j" is "k_R34". FIG. 12 shows the example of the encrypted read image.

As shown in FIG. 12, the image as which a black letter called "A" is displayed is encrypted using said formula (1), and an image that cannot be distinguished is generated.

Encryption algorithm A_R in formula (1) can be one of many well-known algorithms. However, it is an encryption algorithm that converts pixel value $x_i$ of the encryption object into a different value $x_i'$, such that the value after encryption is the same bit length as before encryption, and it is preferable to use the common-key encryption system, which can be decoded with the secret key that encrypted each pixel.

Moreover, as above-mentioned, in the information for encryption shown in FIG. 9, if the value of a corresponding pixel is "0", the disclosure restriction process unit 432 will determine that the pixel is not the restriction-on-disclosure information, and will not perform the encryption process.

In step S1009, when the disclosure restriction process unit 432 performs the encryption process for each pixel, as shown in FIG. 12, it determines whether a defect is detected in each pixel, and whether each pixel is located at a boundary with the pixel in which a defect is detected. Thereby, without encrypting the pixel in which the defect is detected, the disclosure restriction process unit 432 operates so that the pixel may remain as it is. Even if it is the state in which the area of restriction-on-disclosure information was encrypted, the disclosure restriction process unit 432 performs the encryption process so that discrimination of the defect is possible. This encryption process is explained with reference to FIGS. 13A and 13B.

Figure 13A:
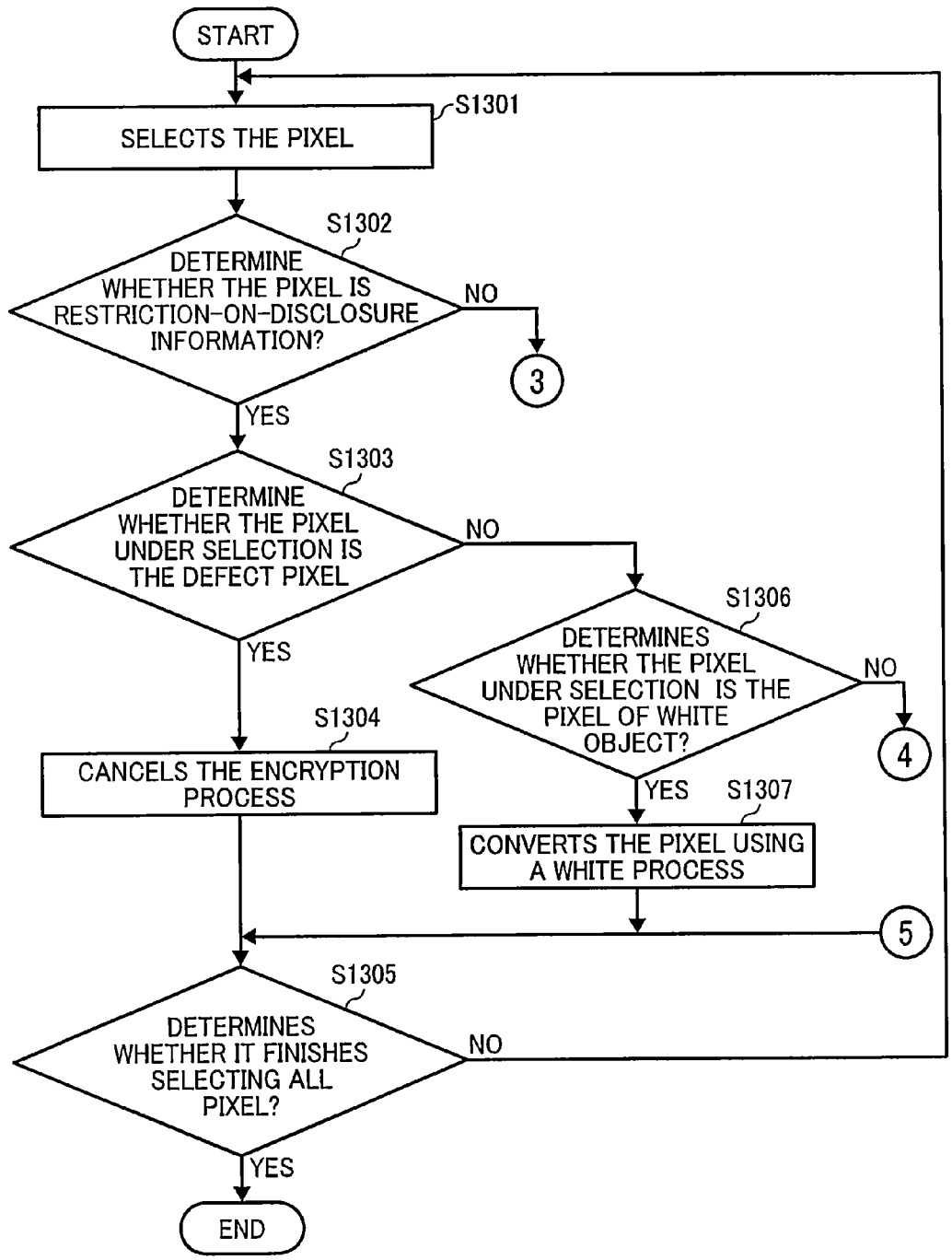
FIGS. 13A and 13B show an illustration for explaining an operation of extracting corners of the image according to an example embodiment.
Figure 13B:
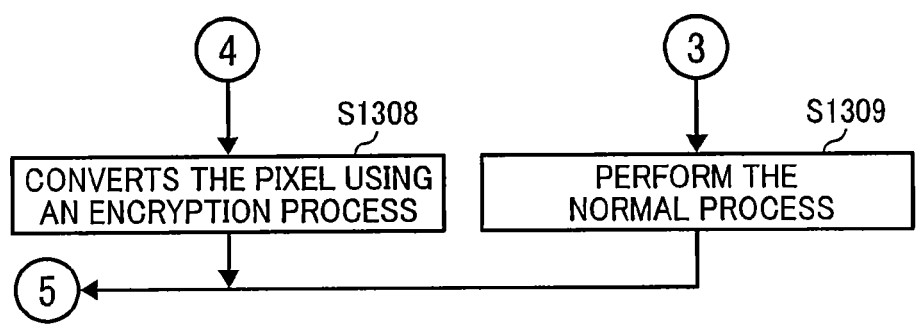

As shown in FIGS. 13A and 13B, the disclosure restriction process unit 432, which started the process of step S1009, selects the pixels of the read image in order (S1301) to determine whether each pixel is restriction-on-disclosure information (S1302). In step S1302, the disclosure restriction process unit 432 determines whether the selected pixel is the restriction-on-disclosure information based on the information of the position corresponding to the pixel under selection among the information for encryption shown in FIG. 9.

As a result of the judgment of step S1302, if the pixel under selection is not the restriction-on-disclosure information (S1302/NO), the disclosure restriction process unit 432 will perform a normal process on the pixel that is not the restriction-on-disclosure information (S1309). On the other hand, when the pixel under selection corresponds to restriction-on-disclosure information (S1302/YES), the disclosure restriction process unit 432 determines whether the pixel under next selection is a defect pixel (S1303).

In step S1303, the disclosure restriction process unit 432 determines whether the pixel under selection is a defect pixel based on the result of the comparison process of S1007 of FIG. 10. As a result of the judgment of step S1303, when the pixel under selection is the defect pixel (S1303/YES), the disclosure restriction process unit 432 cancels the encryption process of the pixel under selection (S1304). That is, even if the pixel under selection has the restriction-on-disclosure information, the value of the pixel is maintained, and the defect pixel is not encrypted.

As the result of the determination in step S1303, when the pixel under selection is not a defect pixel, the disclosure restriction process unit 432 determines whether the pixel under selection is the pixel of a white object (S1306). The pixel of a white object is a pixel prepared with a meaning that facilitates confirmation of a defect pixel by making the surroundings into white, while leaving it about a defect pixel, without encrypting among the read image as which restriction-on-disclosure information was encrypted.

Therefore, in step S1306, the disclosure restriction process unit 432 determines whether the pixel under selection is in an area around a defect pixel. The disclosure restriction process unit 432 determines the distance to a defect pixel nearest to the pixel under selection by a pixel count, and calculates a pixel spacing. If the distance to the defect pixel nearest to the pixel is less than a predetermined threshold value, the disclosure restriction process unit 432 determines that the pixel under selection is in an area around the defect pixel.

As a result of the judgment in S1306, when the disclosure restriction process unit 432 determines that the pixel under selection is a white object pixel (S1306/YES), the disclosure restriction process unit 432 converts the pixel under selection using a white process, i.e., into a pixel value which shows white (S1307).

On the other hand, when the disclosure restriction process unit 432 determines that the pixel under selection is not a white object pixel (S1306/NO), the disclosure restriction process unit 432 carries out the encryption process on the pixel under selection, as shown in FIG. 12 (S1308).

The process of step S1306 and step S1307 is a process for facilitating confirmation of the defect pixel. When the kind of the defect is a white line, if the surroundings are made into white, it will be hard to distinguish. Therefore, it is preferable for the disclosure restriction process unit 432 to determine the kind of the defect, and to change the process of S1307 according to the kind of the defect. Since the discrimination of the white line is possible even if surroundings of the defect are encrypted, when the kind of the defect is the white line, the process especially in step S1307 can not be performed. That is, the process of step S1307 is a process that makes the pixel around the pixel determined as the defect a color different from the pixel determined as the defect.

If the process in any one of steps S1304, S1307, S1308, and S1309 is finished, the disclosure restriction process unit 432 determines whether it has finished selecting all pixels in the page in the encryption process (S1305). The process from step S1301 is repeated until all pixels are finalized (S1305/NO). If the disclosure restriction process unit 432 finishes selecting all pixels (S1305/YES), the encryption process of step S1009 will be finished.

FIGS. 14A-14E illustrate the encryption process of FIG. 13. FIG. 14A shows a part of the read image before encryption without a defect. In this case, when restriction-on-disclosure information is encrypted, as shown in FIG. 14B, part of a figure will be encryption-processed and will become an image that cannot be distinguished.

FIG. 14C shows a part of the read image when the defect arises in the read image shown in FIG. 14A. In the example of FIG. 14C, a stripe-like defect vertically divides through the fields of "aggregate payment" and "payday," and the toner-spill-like defect superimposes on part of the "12" of the "payday" field.

In this case, if the encryption operation of FIG. 13 is performed, as shown in FIG. 14D, the "aggregate payment" and the "payday" parts of the figure are encrypted, and the stripe-like defect and the toner-spill like defect will be displayed as it is, without being encrypted. Moreover, the surroundings of the stripe-like defect and the toner-spill like defect are white-processed so that the encrypted part of the figure and the defects are connected and discrimination of the defects becomes difficult.

Thus, based on the restriction-on-disclosure position information, the area where restriction-on-disclosure information is displayed is not only encrypted simply, but the pixel determined as a defect is not encrypted, and is output as it is. Therefore, the information, for example, personal information, etc., which should be disclosure-restricted, is encrypted, and the defect is detected for determining the cause of the defect, when a third party views the read image. That is, when the defect is detected in the part which should be encrypted in the image of the defect-determined page, it becomes possible to restrict disclosure of the information but to also disclose the content of the defect.

Moreover, as explained with respect to FIG. 9 and formula (1), the encryption process is performed based on the key contained in the restriction-on-disclosure information, wherein the key is different for every pixel. Therefore, even if the key corresponding to one pixel is discovered, it is impossible to decode all the pixels, and it is possible to perform encryption with high security.

Furthermore, since the encryption process is performed by the combination of the information for encryption, as shown in FIG. 9, and the secret key shown in FIG. 11, it is possible to raise security intensity by the encryption process.

The process of generating the restriction-on-disclosure positional information, as shown in FIG. 8, is explained. DFE 1 shown in FIG. 1 generates an input into the engine controller 2. As above-mentioned, DFE 1 receives a print job to generate the bitmap data. The print job for the preprint printing contains image data to be outputted (hereafter, "output image data"). The output image can contain tag information, which shows the meaning of each data.

FIG. 15 shows an example of such tag information. As shown in FIG. 15, the output image contains the tag, which shows the content of the information expressed by the character information, such as "<title>daily report" and "<date>xx/xx/xx", and the tag that shows the position where the character information is displayed, for example, image like "<position>xx and xx" for every character information contained in the output image data.

Therefore, when DFE 1 generates the bitmap data for displaying the output image data, DFE 1 determines what each character information means based on the tag of each character information. If DFE 1 determines that the information contained in the list based on the restriction-on-disclosure determined list as shown in FIG. 16, it is judged that it is restriction-on-disclosure information for the character information to which the content of the tag corresponded.

DFE 1 judges the position where the character information is displayed on an image based on the tag of "<position>". DFE 1 sets "1" as shown in FIG. 8 in the position corresponding to the restriction-on-disclosure positional information, which is 1 bit for each pixel, and the resolution is the same as the resolution of the bit map data. Thereby, in the position where the information that should not be disclosed for third parties, such as personal information and confidential information, it becomes possible to generate easily the restriction-on-disclosure positional information to which "1" is set, as shown in FIG. 8.

In addition, in one embodiment, preprint printing was demonstrated as an example. However, this is an example, and if it is an aspect that encrypts a part of a defect-determined read image based on the restriction-on-disclosure positional information that shows the position where restriction-on-disclosure information, such as personal information and confidential information, was displayed, it is possible to acquire the effect according to the present embodiments.

Moreover, the image formation output of variable data, which was explained in the present embodiment, is achieved also in variable printing, which prints by combining images, such as a frame line, to variable data in not only the preprint printing, but DFE 1 and the engine controller 2, which were explained with respect to FIG. 6. Also, in such variable printing, since the position where restriction-on-disclosure information is displayed similarly to the preprint printing when the form is the same, it can acquire an effect similar to the above, by formation of the information for encryption only about the read image mentioned above. Moreover, also in variable printing, since the information of a tag, which was explained with respect to FIG. 15, in the print job is contained in many cases, it is possible to form a restriction-on-disclosure positional information by the method mentioned above.

Moreover, in one embodiment, the case in which the master image processing unit 402 obtains a restriction-on-disclosure positional information, and generates the information for encryption, was explained as an example. The master image processing unit 402 contains hardware equipped with a parallel calculation function in order to process image information at high-speed. It is possible by using such hardware to perform a resolution-conversion process of a restriction-on-disclosure positional information, a random-number generation process for each pixel, etc., at high-speed.

However, this is only an example. In another embodiment, restriction-on-disclosure positional information can be obtained in the module prepared separately from the master image processing unit 402 and the information for encryption can be generated.

Moreover, in one embodiment, the case where restriction-on-disclosure information was encrypted in the state that can be decoded was explained as an example. However, one object of the present embodiments is restricting disclosure of information and disclosing the content of the defect, when the defect is detected on the portion that should be encrypted in the image of the defect-determined page. Therefore, it is required to keep secret the information that should be restricted, and for the detected defect to be checked. Therefore, it is not essential to be performed in the form in which the secrecy of information that should be restricted can be decoded.

Therefore, the disclosure restriction process unit 432 does not encrypt the pixel contained in the range of information that should be restricted in step S1009 of FIG. 10B, and can smear away the pixel based on the restriction-on-disclosure positional information shown in FIG. 8. As explained in FIGS. 13A and 13B, when the pixels under selection are restriction-on-disclosure information (S1302/YES) and a defect pixel (S1303/YES), the disclosure restriction process unit 432 outputs the pixel without encrypting the pixel.

FIG. 14E shows the process result in the case of performing a painting-over process, when the defect like FIG. 14C arises. As shown in FIG. 14E, the range of restriction-on-disclosure information is converted to black, and information is kept secret. Since the surroundings are white-processed while remaining as it is, similarly to the case of FIG. 14D, it is possible to check the aspect of the defect.

Moreover, in one embodiment, the restriction-on-disclosure information is encrypted. However, the level that should restrict the disclosure, i.e., the necessity for restriction on disclosure, can be different. It may be satisfactory, even if it cancels the encryption of the whole area for confirmation of the defect. For example, in the aggregate payment and the payday fields shown to FIG. 14A, it is the aggregate payment that should be restricted more. That is, a payday can cancel the encryption of the area, when the level which should be restricted is low, and a defect produces disclosure to the area of a payday with respect to aggregate payment.

FIG. 17 is a figure that shows an example at the time of encryption-processing with such a rule. As shown in FIG. 17, part of "aggregate payment" is encrypted, but as for the payday portion, the encryption of not only a defect pixel but the whole area is canceled. Such an aspect becomes possible by setting a security level for each restriction-on-disclosure information. FIG. 18 shows the information of such a security level setting.

As shown in FIG. 18, the setting information of a security level is as follows. The display area of restriction-on-disclosure information like "the area 1" and "area 2" . . . is specified by the "coordinate" "–(XX, XX) (XX, XX)". It is the information in which "security levels", such as "high" and "low", were set for each every area. In the operation explained in FIGS. 13A and 13B, when the pixels under selection are restriction-on-disclosure information (S1302/YES) and a defect pixel (S1303/YES), the disclosure restriction process unit 432 will continue to perform the process similar to FIGS. 13A and 13B, based on the information of FIG. 18, if the security level of the area where the pixel under selection is contained is "high".

On the other hand, when the security level of the area where the pixel under selection is contained is "low", the disclosure restriction process unit 432 sets the "coordinate" of the restriction-on-disclosure area as an area which cancels encryption. In subsequent processes, if the pixel selected in step S1301 is included in the area that cancels encryption, the disclosure restriction process unit 432 will cancel encryption without performing the process of steps S1302 and S1303. Moreover, the encryption of the pixel of the area set as an area that cancels encryption among the pixels already encrypted in the page under judgment is cancelled. By such a process, the encryption process according to the security level for every area, as shown in FIG. 17, is achievable.

In addition, the information shown in FIG. 18 is obtained from the engine controller 2 side similarly to the restriction-on-disclosure positional information explained in FIG. 8. Further, for example, it is also possible to form automatically using the information explained in FIG. 15 and FIG. 16. That is, in the restriction-on-disclosure judgment list shown in FIG. 16, if the security level is set for each information, the information shown in FIG. 18 is formable by setting the security level to the area set as a restriction-on-disclosure position, based on the information.

The invention claimed is:

1. An image inspection apparatus for inspecting an image output on a recording medium by scanning the output image as a scanned image, the image inspection apparatus comprising:
    an inspection reference image generator implemented by processing circuitry and configured to obtain an output-target image print data, and to generate an inspection reference image using the output-target image print data, the inspection reference image providing a reference in inspection of a read image;
    an inspection result acquisition unit implemented by the processing circuitry and configured to acquire a result of a defect determination based on a difference between the generated inspection reference image and the read image;
    a restriction-on-disclosure process unit implemented by the processing circuitry and configured to change, based on restriction-on-disclosure positional information, which indicates a restricted area in the read image that should be restricted when displayed, a value of a pixel in the restricted area in the read image, when the result of the defect determination indicates that a defect is detected in the read image, to generate a corrected image; and
    an information transmission unit implemented by the processing circuitry and configured to transmit the corrected image through a network,
    wherein the restriction-on-disclosure process unit is further configured to maintain the value of the pixel without changing the value of the pixel, when the pixel is included in the restricted area and is determined as the defect.

2. The image inspection apparatus of claim 1, wherein the restriction-on-disclosure process unit is further configured to change a value of a pixel surrounding the pixel in the restricted area, to a value different from a value of the pixel determined as the defect.

3. The image inspection apparatus of claim 2, wherein the restriction-on-disclosure process unit is further configured to change a value of the pixel surrounding the pixel in the restricted area, to a value of a pixel showing a white color.

4. The image inspection apparatus of claim 2, wherein the restriction-on-disclosure process unit is further configured to judge a pixel whose pixel spacing with the pixel determined as the defect is below a prescribed threshold value to be a surroundings pixel of the pixel determined as the defect.

5. The image inspection apparatus of claim 2, wherein the restriction-on-disclosure process unit is further configured to maintain, when the pixel included in the restricted area, based on the information which shows a level of necessity for restriction on disclosure about the restricted area, is determined as the defect, the value of the pixel included in the restricted area, without changing the value of the pixel.

6. An image inspection method for inspecting an image output on a recording medium by scanning the output image as a scanned image, the image inspection method comprising:
    obtaining an output-target image print data, and generating an inspection reference image using the output-target image print data, the inspection reference image providing a reference in inspection of a read image;
    acquiring a result of a defect determination based on a difference between the generated inspection reference image and the read image;
    changing, based on restriction-on-disclosure positional information, which indicates a restricted area in the read image that should be restricted when displayed, a value of a pixel in the restricted area in the read image, when the result of the defect determination indicates that a defect is detected in the read image, to generate a corrected image; and
    transmitting the corrected image through a network,
    wherein the changing step further comprises maintaining the value of the pixel without changing the value of the pixel, when the pixel is included in the restricted area and is determined as the defect.

7. The image inspection method of claim 6, wherein the changing step further comprises changing a value of a pixel surrounding the pixel in the restricted area, to a value different from a value of the pixel determined as the defect.

8. The image inspection method of claim 7, wherein the changing step further comprises changing a value of the pixel surrounding the pixel in the restricted area, to a value of a pixel showing a white color.

9. The image inspection method of claim 7, wherein changing step further comprises judging a pixel whose pixel spacing with the pixel determined as the defect is below a prescribed threshold value to be a surroundings pixel of the pixel determined as the defect.

10. The image inspection method of claim 7, wherein the changing step further comprises maintaining, when the pixel included in the restricted area, based on the information which shows a level of necessity for restriction on disclosure about the restricted area, is determined as the defect, the value of the pixel included in the restricted area, without changing the value of the pixel.

11. A non-transitory computer-readable medium storing a program that, when executed by a computer processor, causes the processor to execute an image inspection method for inspecting an image output on a recording medium by scanning the output image as a scanned image, the image inspection method comprising:

obtaining an output-target image print data, and generating an inspection reference image using the output-target image print data, the inspection reference image providing a reference in inspection of a read image;

acquiring a result of a defect determination based on a difference between the generated inspection reference image and the read image;

changing, based on restriction-on-disclosure positional information, which indicates a restricted area in the read image that should be restricted when displayed, a value of a pixel in the restricted area in the read image, when the result of the defect determination indicates that a defect is detected in the read image, to generate a corrected image; and transmitting the corrected image through a network, wherein the changing step further comprises maintaining the value of the pixel without changing the value of the pixel, when the pixel is included in the restricted area and is determined as the defect.

12. The computer-readable medium of claim 11, wherein the changing step further comprises changing a value of a pixel surrounding the pixel in the restricted area, to a value different from a value of the pixel determined as the defect.

13. The computer-readable medium of claim 12, wherein the changing step further comprises changing a value of the pixel surrounding the pixel in the restricted area, to a value of a pixel showing a white color.

14. The computer-readable medium of claim 12, wherein changing step further comprises judging a pixel whose pixel spacing with the pixel determined as the defect is below a prescribed threshold value to be a surroundings pixel of the pixel determined as the defect.

15. The computer-readable medium of claim 12, wherein the changing step further comprises maintaining, when the pixel included in the restricted area, based on the information which shows a level of necessity for restriction on disclosure about the restricted area, is determined as the defect, the value of the pixel included in the restricted area, without changing the value of the pixel.

* * * * *

UNITED STATES PATENT AND TRADEMARK OFFICE
CERTIFICATE OF CORRECTION

Page 1 of 1

PATENT NO. : 9,131,187 B2
APPLICATION NO. : 14/174419
DATED : September 8, 2015
INVENTOR(S) : Takako Shijoh It is certified that error appears in the above-identified patent and that said Letters Patent is hereby corrected as shown below:

On the title page, Item (30), the Foreign Application Priority Data Information is incorrect. Item (30) should read:

--(30)  Foreign Application Priority Data

| Feb. 12, 2013 | (JP)..................................2013-024688 |
| Feb. 4, 2014  | (JP)..................................2014-019199 |
| Mar. 15, 2013 | (JP)..................................2013-053995-- |

Signed and Sealed this
Second Day of February, 2016

Michelle K. Lee
*Director of the United States Patent and Trademark Office*